(12) United States Patent
Eichinger et al.

(10) Patent No.: US 9,534,526 B1
(45) Date of Patent: *Jan. 3, 2017

(54) APPARATUSES FOR COOLING EXHAUST COMPONENTS OF MARINE ENGINES

(71) Applicant: Brunswick Corporation, Lake Forest, IL (US)

(72) Inventors: Charles H. Eichinger, Oshkosh, WI (US); Scott G. Ahlswede, Plymouth, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,582

(22) Filed: Apr. 15, 2015

Related U.S. Application Data (63) Continuation of application No. 13/646,418, filed on Oct. 5, 2012, now Pat. No. 9,057,314.

(51) Int. Cl.
| | | |
|---|---|---|
| *F01N 3/04* | (2006.01) | |
| *F01P 3/20* | (2006.01) | |
| *B63H 21/32* | (2006.01) | |
| *F01P 5/12* | (2006.01) | |
| *F01N 13/14* | (2010.01) | |
| *F01P 3/00* | (2006.01) | |

(52) U.S. Cl.
CPC .............. *F01P 3/202* (2013.01); *B63H 21/32* (2013.01); *F01N 13/141* (2013.01); *F01P 5/12* (2013.01); *F01N 3/043* (2013.01); *F01P 2003/001* (2013.01)

(58) Field of Classification Search
CPC ........... F01N 2590/02; F01N 2590/021; F01N 2590/022; F01N 3/043; F01N 13/141; F01N 3/046; F01P 2060/16; F01P 3/202; B63H 20/24

USPC ............... 440/88 C, 88 D, 88 G, 88 J, 88 K, 88 M, 440/88 HE, 89 B, 89 C, 89 D
See application file for complete search history.

(56) References Cited

U.S. PATENT DOCUMENTS

| | | | | |
|---|---|---|---|---|
| 2,417,448 | A * | 3/1947 | Rouy ........................ | F02F 1/14 123/41.8 |
| 4,136,648 | A * | 1/1979 | Ernest ..................... | F02B 75/22 123/193.3 |
| 5,820,426 | A * | 10/1998 | Hale ....................... | B63H 21/32 440/111 |
| 6,582,263 | B1 * | 6/2003 | Jaeger .................... | B63H 21/32 440/88 J |
| 7,628,663 | B2 * | 12/2009 | McKinney ............. | B63H 21/32 440/89 B |

(Continued)

FOREIGN PATENT DOCUMENTS

GB         181832        6/1922

*Primary Examiner* — Andrew Polay
(74) *Attorney, Agent, or Firm* — Andrus Intellectual Property Law, LLP (57) ABSTRACT

An elongated exhaust conduit comprises a first end receiving hot exhaust gas from a marine engine and a second end discharging the exhaust gas. An elongated cooling water jacket extends adjacent to the exhaust conduit. The cooling water jacket conveys the raw cooling water adjacent to the exhaust conduit to thereby cool the exhaust conduit and warm the raw cooling water therein and discharges the warmed cooling water to cool the marine engine. The cooling water jacket comprises first and second channels that are separate from each other. The cooling water is oriented in a helical flow around the exhaust conduit.

19 Claims, 6 Drawing Sheets

(56) References Cited

U.S. PATENT DOCUMENTS

| | | | |
|---|---|---|---|
| 8,388,393 B1* | 3/2013 | Eichinger | B63H 21/32 123/195 P |
| 8,540,536 B1 | 9/2013 | Eichinger et al. | |
| 2009/0270000 A1* | 10/2009 | Eichinger | B63H 21/32 440/89 R |
| 2011/0067397 A1* | 3/2011 | Hirth | F02B 37/025 60/602 |

* cited by examiner

APPARATUSES FOR COOLING EXHAUST COMPONENTS OF MARINE ENGINES

CROSS REFERENCE TO RELATED APPLICATION

This application is a continuation of U.S. patent application Ser. No. 13/646,418, filed Oct. 5, 2012, which is incorporated herein by reference in entirety.

FIELD

The present disclosure relates to marine engines and to apparatuses for cooling exhaust components of marine engines.

BACKGROUND

U.S. patent application Ser. No. 12/939,039, filed Nov. 3, 2010, the disclosure of which is hereby incorporated by reference in entirety, discloses an outboard motor including an internal combustion engine, a driveshaft housing, a molded adapter plate connecting the internal combustion engine and the driveshaft housing; and an elongated exhaust conduit conveying hot exhaust gas from the internal combustion engine, the exhaust conduit extending from a first end portion located proximate to the internal combustion engine to a second end portion located proximate to the driveshaft housing. The exhaust conduit and adapter plate are separate components.

U.S. patent application Ser. No. 12/944,454, filed Nov. 11, 2010, the disclosure of which is hereby incorporated by reference in entirety, discloses a cooling system for a marine engine. The cooling system has an elongated exhaust conduit comprising a first end receiving hot exhaust gas from the marine engine and a second end discharging the exhaust gas; and an elongated cooling water jacket extending adjacent to the exhaust conduit. The cooling water jacket receives raw cooling water at a location proximate to the second end of the exhaust conduit, conveys raw cooling water adjacent to the exhaust conduit to thereby cool the exhaust conduit and warm the raw cooling water, and thereafter discharges the warmed cooling water to cool the internal combustion engine.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure arose during continued research and development of apparatuses for cooling exhaust components of marine engines.

In some examples, apparatuses for cooling exhaust components of marine engines comprise an elongated exhaust conduit comprising a first end receiving hot exhaust gas from the marine engine and a second end discharging the exhaust gas. An elongated cooling water jacket extends adjacent to the exhaust conduit. The cooling water jacket conveys the raw cooling water adjacent to the exhaust conduit to thereby cool the exhaust conduit and warm the raw cooling water therein and discharges the warmed cooling water to cool the marine engine. In some examples, the cooling water jacket defines first and second channels that are separate from each other. In some examples, the cooling water is oriented into a helical flow around the exhaust conduit, such as around a chamber that is located adjacent a junction between the exhaust conduit and an exhaust manifold.

BRIEF DESCRIPTION OF THE DRAWINGS

Examples of apparatuses for cooling exhaust components of marine engines are described with reference to the following figures. The same numbers are used throughout the figures to reference like features and components.

DETAILED DESCRIPTION OF THE DRAWINGS

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
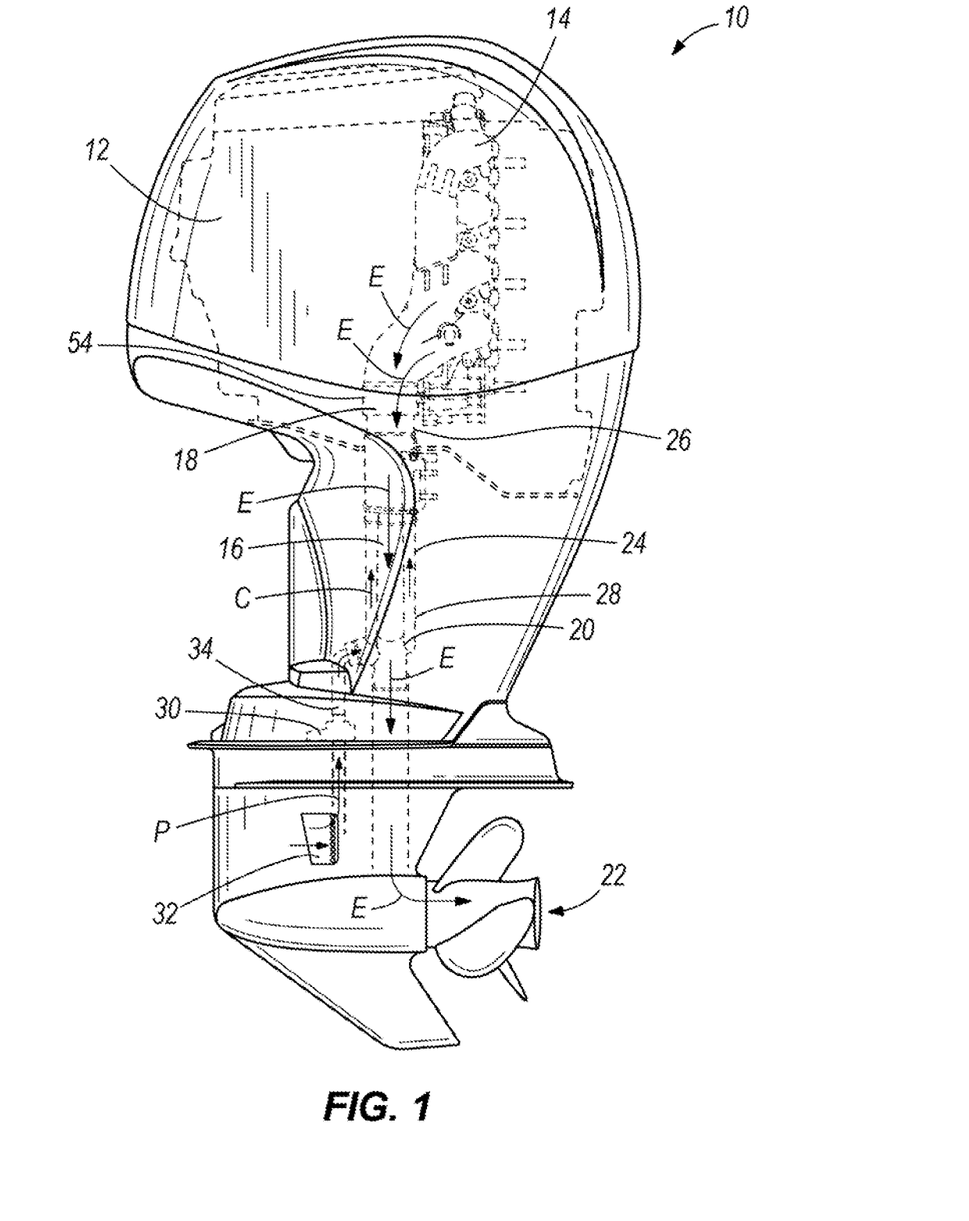
FIG. 1 is a side view of a marine engine, showing exhaust components of the marine engine in dashed line format.

FIG. 1 depicts a marine engine 10, which in the example shown is an outboard motor having an internal combustion engine 12 that emits hot exhaust gas to an exhaust manifold 14. The exhaust manifold 14 discharges to an elongated exhaust conduit 16, which has a first end 18 receiving the hot exhaust gas from the internal combustion engine 12 via the exhaust manifold 14, and a second end 20 discharging the exhaust gas. Exhaust gas travel is shown at arrows E. Exhaust gas leaves the marine engine 10 via an exhaust outlet 22.

Cooling apparatuses are provided for cooling hot engine parts, including among other things the exhaust manifold 14, exhaust conduit 16, and/or other exhaust components of the marine engine 10. The cooling apparatuses include an elongated cooling water jacket 24 extending adjacent to the exhaust conduit 16. The cooling water jacket 24 receives raw cooling water at a location proximate to the second end 20 of the exhaust conduit 16, conveys raw cooling water adjacent to the exhaust conduit 16, as shown at arrow C, to thereby cool the exhaust conduit 16 and warm the raw cooling water therein. Cooling water is thereafter discharged to cool the exhaust manifold 14 and other components of the internal combustion engine 12. The cooling water jacket 24 includes a first end 26 discharging the cooling water to a cooling jacket (not shown) associated with the exhaust manifold 14 and a second end 28 receiving raw cooling water at a location proximate to the second end 20 of the exhaust conduit 16. A water pump 30 draws raw cooling water through inlet 32, as shown at arrow P, and pumps the raw cooling water upwardly from the second end 28 of the cooling water jacket 24 to the first end 26 of the cooling water jacket 24. In the example shown, the inlet 32 is connected to the second end 28 of the cooling water jacket 24 via the water pump 30 and a water tube 34.

Figure 2:
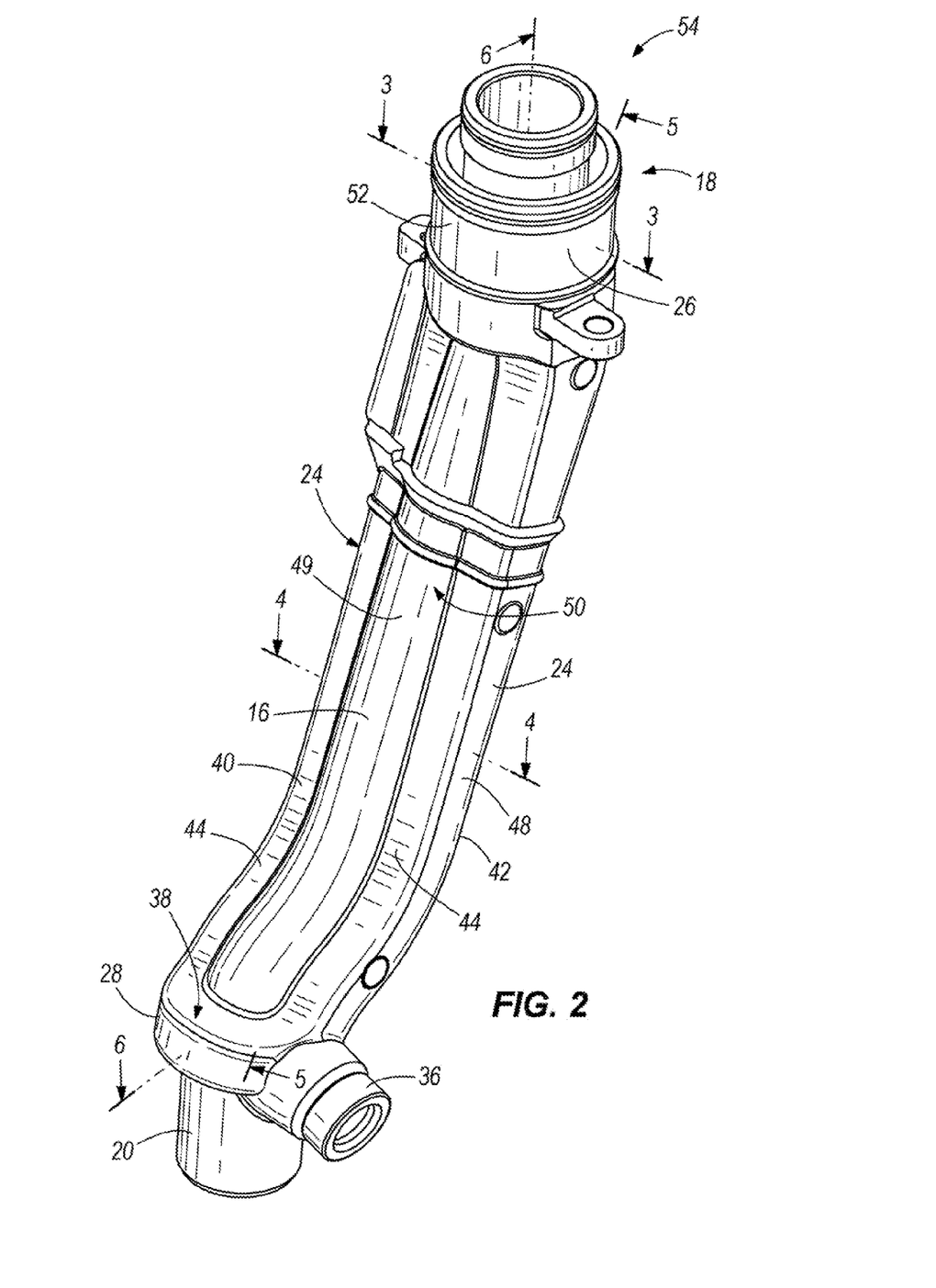
FIG. 2 is a perspective view of an exhaust conduit and a cooling water jacket.
Figure 3:
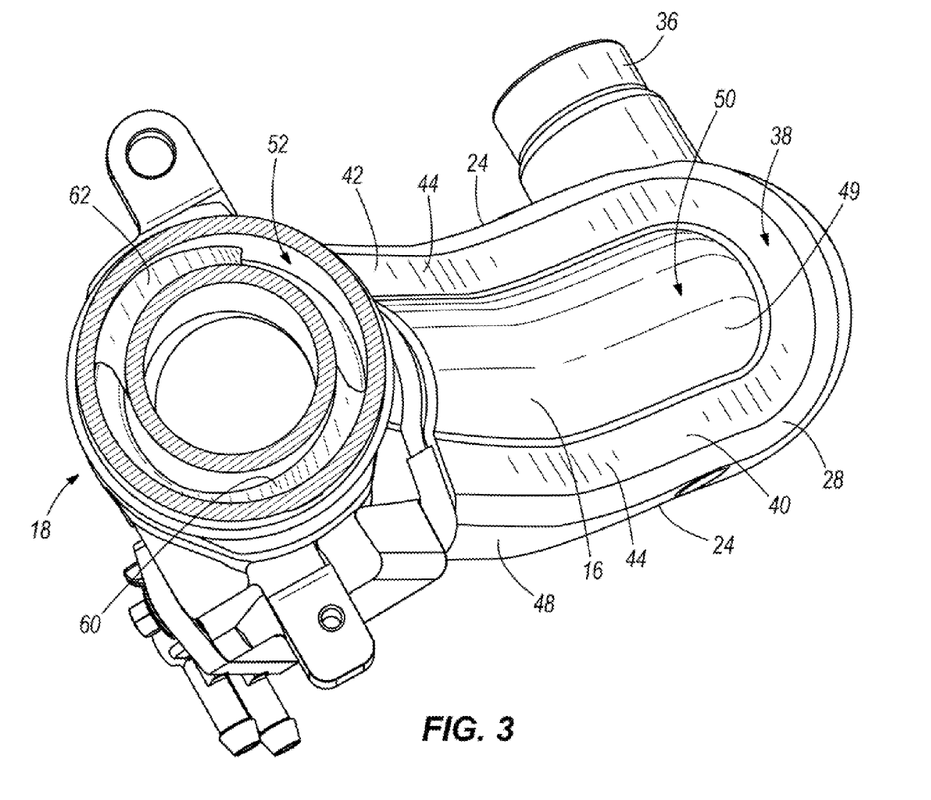
FIG. 3 is a view of Section 3-3 taken in FIG. 2.
Figure 4:
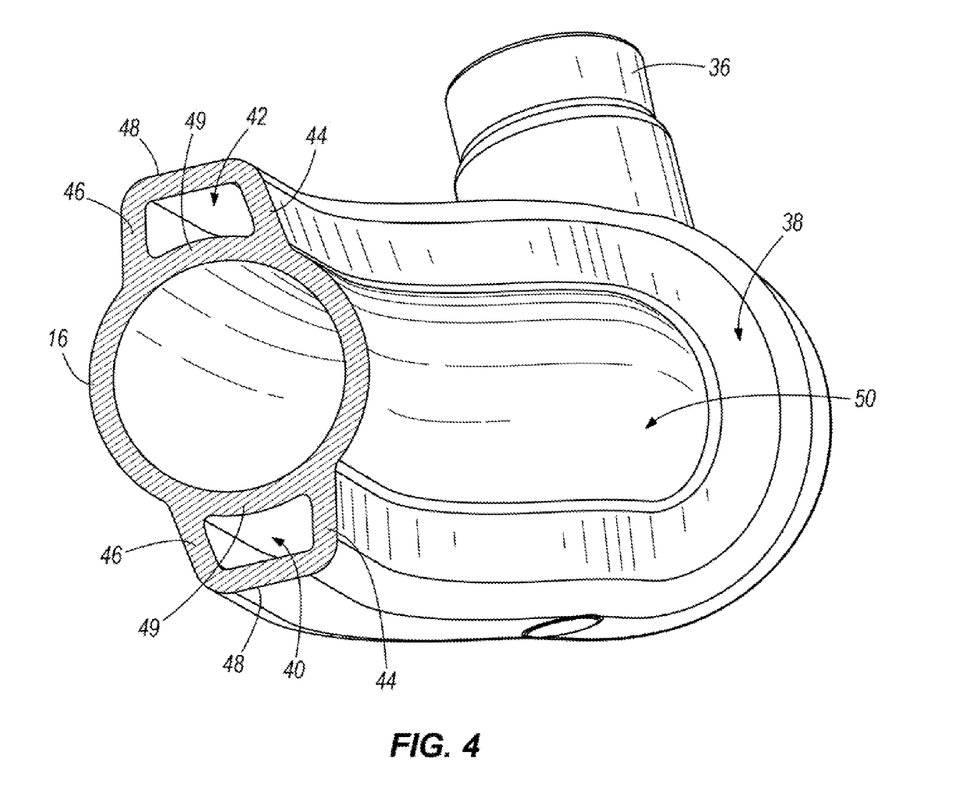
FIG. 4 is a view of Section 4-4 taken in FIG. 2.
Figure 5:
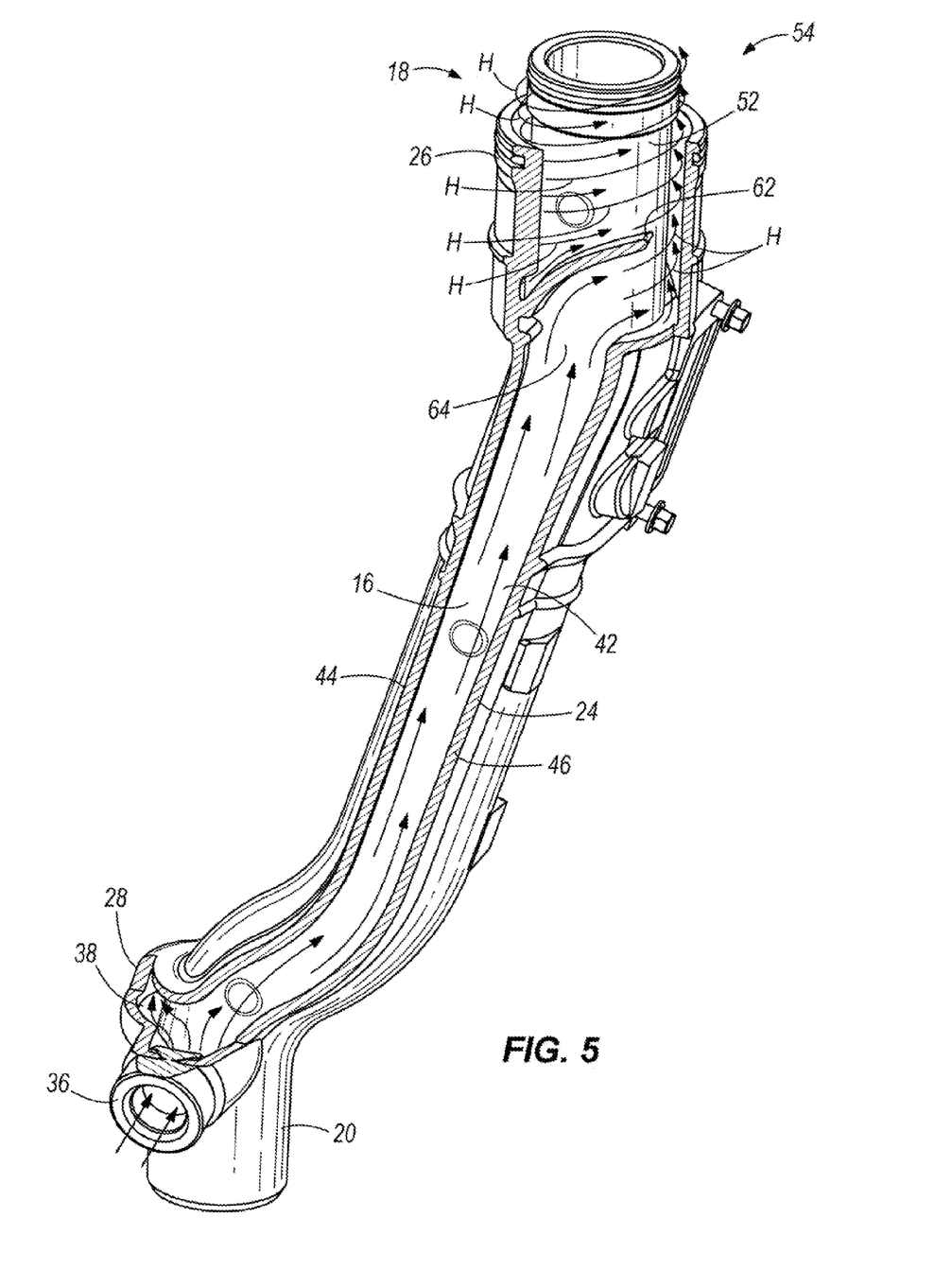
FIG. 5 is a view of Section 5-5 taken in FIG. 2.

As shown in FIGS. 2-5, the second end 28 of the cooling water jacket 24 receives cooling water via a fitting 36 for water tube 34. Cooling water from the water tube 34 is received in a lower chamber 38 defined by the cooling water jacket 24 and then bifurcated so as to flow into opposing first and second channels 40, 42 defined by the cooling water jacket 24. First and second channels 40, 42 are separate from each other and disposed on radially opposite sides of the exhaust conduit 16. As shown in FIGS. 2 and 5, the first and second channels 40, 42 both taper from a location proximate to the first end 18 of the exhaust conduit 16 to a location proximate to the second end 20 of the exhaust conduit 16. As shown in FIGS. 4 and 5, each of the first and second channels 40, 42 are defined by the cooling jacket 24, which includes sidewalls 44, 46 that extend radially outwardly from an outer surface 49 of the exhaust conduit 16. Each channel 40, 42 is defined by an end wall 48 joining the outer ends of sidewalls 44, 46 to close the noted first and second channels 40, 42 and define a tapered space therein for flow of cooling water adjacent the outer surface 49 of the exhaust conduit 16. Therefore, as cooling water flows upwardly from the second end 28 of the cooling water jacket 24 to the first end 26 of the cooling water jacket, the respective cross-sectional areas of the first and second channels 40, 42 increase, due to the noted taper. A non-jacketed portion 50 of the exhaust conduit 16 exists between the first and second channels 40, 42. The number and configuration of channels can vary from that which is shown.

Tapering of the first and second channels 40, 42 from the first end 18 to the second end 20 diffuses cooling water flow and helps prevent stagnant areas of cooling water flow. Attachment of the cooling jacket 24 and its noted sidewalls 44, 46 and end wall 48 to the exhaust conduit 16 also provides significant area for metal to flow between the exhaust conduit 16 and the end wall 48 during casting processes. The non-jacketed portion 50 of the exhaust conduit 16 adjacent the first and second channels 40, 42 is effectively cooled by conducting heat to wetted areas. Positioning of the first and second channels 40, 42 on opposite sides of the exhaust conduit 16 helps prevent asymmetric thermal distortion of the exhaust conduit 16. Such positioning also helps avoid a potential problem of having a relatively hot inner diameter (i.e. exhaust conduit 16) connected to and constrained by a relatively cooler outer cooling water jacket 24. Too many of such connections can cause high thermal stress in an annular design.

Figure 6:
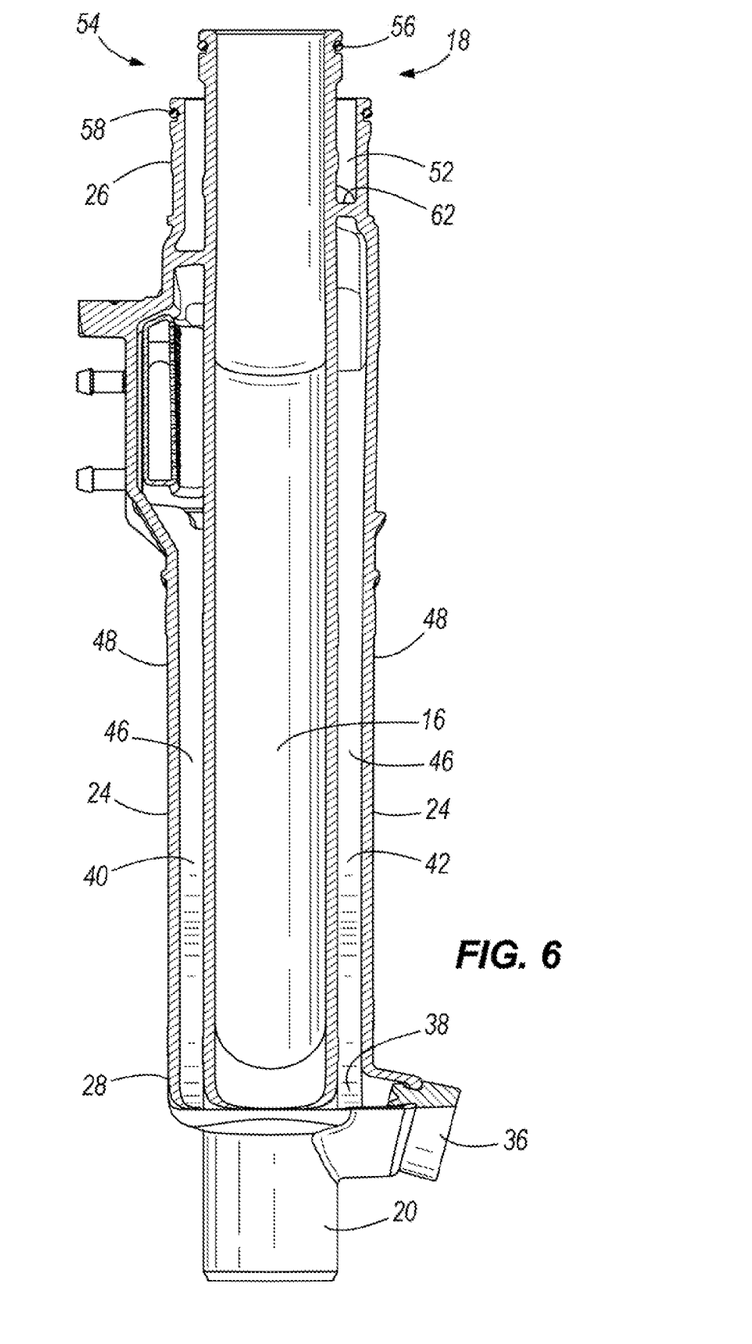
FIG. 6 is a view of Section 6-6 taken in FIG. 2.

Referring to FIG. 2, proximate to the first end 18 of the exhaust conduit 16, the cooling water jacket 24 defines an upper chamber 52 into which the first and second channels 40, 42 conduct the cooling water. The upper chamber 52 can, for example, have an annular shape. The upper chamber 52 is located adjacent a junction 54 where the exhaust conduit 16 and exhaust manifold 14 are connected. With reference to FIG. 6, seals 56, 58 are disposed between the exhaust conduit 16 and exhaust manifold 14, and also between the cooling water jacket 24 for the exhaust conduit 16 and a cooling water jacket (not shown) for the exhaust manifold 14, respectively. The upper chamber 52 is adjacent the noted seals 56, 58 and provides cooling water flow there past to maintain the noted seals 56, 58 at a certain temperature range to thereby prevent degradation of the seals 56, 58.

As shown in FIGS. 3 and 5, the cooling water jacket 24 is structured to direct the cooling water into a helical flow pattern around the exhaust conduit 16 at the upper chamber 52. See arrows H in FIG. 5. The helical flow pattern H helps to evenly distribute cooling water in the upper chamber 52. In the example shown in the figures, a first vane 60 orients flow of cooling water from the first channel 40 into the noted helical flow. A second vane 62 orients flow of cooling water from the second channel 42 into the noted helical flow. Both vanes 60, 62 are curved and extend across an opening 64 at a transition between the first and second channels 40, 42 and the upper chamber 52. The exact configuration of the vanes 60, 62 can vary from that which is shown.

The upper chamber 52 and vanes 60, 62 provide even distribution of cooling water for cooling the noted junction 54 including seals 56, 58. Cooling water entering the upper chamber 52 is directed into the noted helical flow pattern H to provide an even amount of cooling at the location between the first and second channels 40, 42 and the upper chamber 52. The helical flow pattern H of cooling water maintains a high velocity by covering the upper chamber 52 in a much longer flow path than would occur with an axial flow. This provides an ideal arrangement for cooling the upper chamber 52 and noted area of seals 56, 58. Further, the high velocity swirling flow not only improves the convection coefficient, but tends to sweep out any entrained air or steam in the junction 54.

In the example shown, the vanes 60, 62 orient the flow of cooling water into the noted helical flow in the upper chamber 52; however, it is possible to orient the flow of cooling water into the helical flow by other means. For example, the helical flow could be induced by a properly oriented jet, nozzle, or hole. Any like structure and/or device for orienting the cooling water into the noted helical flow pattern could be employed and is contemplated by the present disclosure.

The overall design reduces the amount of metal required for the cooling water jacket 24 and the connection to the exhaust conduit 16 while optimizing flow and convection in the cooling water jacket 24. Water velocity adjacent the seals 56, 58 is much higher and more evenly distributed than in previous designs. The apparatus can be cast by semi-permanent mold, sand or lost foam methods.

What is claimed is:

1. A system for cooling exhaust components of a marine engine, the system comprising:
    an exhaust manifold that conveys exhaust gas from the marine engine;
    an exhaust conduit having a first end that receives the exhaust gas from the exhaust manifold and an opposite, second end that discharges the exhaust gas;
    a cooling water jacket on the exhaust conduit, wherein the cooling water jacket conveys cooling water along an outer surface of the exhaust conduit to thereby cool the exhaust conduit and warm the cooling water, wherein the cooling water jacket has first and second channels that are separate from each other; and
    a pump that pumps cooling water into the first and second channels and along the outer surface in parallel from the second end of the exhaust conduit to the first end of the exhaust conduit.

2. A system for cooling exhaust components of a marine engine, the system comprising:
    an exhaust manifold that conveys exhaust gas from the marine engine;
    an exhaust conduit having a first end that receives the exhaust gas from the exhaust manifold and an opposite, second end that discharges the exhaust gas;
    a cooling water jacket on the exhaust conduit, wherein the cooling water jacket conveys cooling water along an outer surface of the exhaust conduit to thereby cool the exhaust conduit and warm the cooling water, wherein the cooling water jacket has first and second channels that are separate from each other; and a pump that pumps cooling water into the first and second channels and along the outer surface from the second end of the exhaust conduit to the first end of the exhaust conduit;

wherein each the first and second channels are tapered from a location that is closer to the second end of the exhaust conduit than the first end of the exhaust conduit to a location that is closer to the first end of the exhaust conduit than the second end of the exhaust conduit.

3. The system according to claim 1, wherein the cooling water jacket defines a chamber into which the first and second channels conduct the cooling water.

4. The system according to claim 3, wherein the chamber is located adjacent a junction between the exhaust conduit and the exhaust manifold.

5. The system according to claim 4, further comprising at least one seal at the junction between the exhaust conduit and the exhaust manifold.

6. The system according to claim 4, wherein the cooling water is directed into a helical flow around the exhaust conduit.

7. The system according to claim 6, wherein the helical flow is in the chamber.

8. The system according to claim 7, wherein the chamber has an annular shape and wherein the helical flow evenly distributes cooling water in the chamber.

9. The system according to claim 6, further comprising at least one vane that orients the cooling water into the helical flow.

10. The system according to claim 9, wherein the vane is curved.

11. The system according to claim 6, further comprising a first vane orienting the cooling water from the first channel into the helical flow and further comprising a second vane orienting the cooling water from the second channel into the helical flow.

12. A system for cooling exhaust components of a marine engine, the system comprising:
   an exhaust manifold that conveys exhaust gas from the marine engine;
   an exhaust conduit having a first end that receives the exhaust gas from the exhaust manifold and an opposite, second end that discharges the exhaust gas;
   a cooling water jacket on the exhaust conduit, wherein the cooling water jacket conveys cooling water along an outer surface of the exhaust conduit to thereby cool the exhaust conduit and warm the cooling water, wherein the cooling water jacket has first and second channels that are separate from each other;
   a pump that pumps cooling water into the first and second channels and along the outer surface from the second end of the exhaust conduit to the first end of the exhaust conduit; and
   an unjacketed portion of the exhaust conduit between the first and second channels.

13. The system according to claim 1, wherein the first and second channels are located on opposite sides of the exhaust conduit.

14. A method for cooling exhaust components of a marine engine, the method comprising:
   conveying exhaust gas from the marine engine via an exhaust manifold;
   conveying the exhaust gas from the exhaust manifold via an exhaust conduit, wherein the exhaust conduit has a first end that receives the exhaust gas from the exhaust manifold and an opposite, second end that discharges the exhaust gas;
   conveying cooling water through a cooling water jacket on an outer surface of the exhaust conduit to thereby cool the exhaust conduit and warm the cooling water, wherein the cooling water jacket has first and second channels that are separate from each other; and
   pumping cooling water into the first and second channels and along the outer surface in parallel from the second end of the exhaust conduit to the first end of the exhaust conduit.

15. The method according to claim 14, comprising directing the cooling water into a helical flow around the exhaust conduit.

16. The method according to claim 14, wherein the cooling water jacket defines a chamber into which the first and second channels conduct the cooling water and further comprising directing the cooling water into a helical flow around the chamber.

17. The method according to claim 14, comprising casting the exhaust conduit and the cooling water jacket via a semi-permanent mold.

18. The method according to claim 14, comprising sand casting the exhaust conduit and the cooling water jacket.

19. The method according to claim 14, comprising lost foam casting the exhaust conduit and the cooling water jacket.

\* \* \* \* \*